United States Patent [19]

Beswick et al.

[11] 4,013,239

[45] Mar. 22, 1977

[54] CONTINUOUS LOOP TAPE CASSETTE

[75] Inventors: Paul R. Beswick, Ipswich; Paul W. Berton, Marblehead; Charles F. Ganem, Newton; Clark E. Johnson, Jr., Weston, all of Mass.

[73] Assignee: Micro Communications Corporation, Waltham, Mass.

[22] Filed: Apr. 14, 1975

[21] Appl. No.: 567,605

[52] U.S. Cl. .......................................... 242/55.19 A
[51] Int. Cl.² ............................................ G11B 23/04
[58] Field of Search ............. 242/55.19 A, 55.19 B, 242/71.8, 74; 360/93, 94, 90, 91, 134, 132

[56] References Cited

UNITED STATES PATENTS

| 2,656,184 | 10/1953 | Eddy | 242/55.19 A |
| 2,830,812 | 4/1958 | Nash et al. | 242/55.19 A |
| 3,617,010 | 11/1971 | Coy | 242/55.19 A |

FOREIGN PATENTS OR APPLICATIONS

| 1,020,190 | 11/1957 | Germany | 242/55.19 A |

*Primary Examiner*—George F. Mautz

[57] ABSTRACT

A continuous loop tape cassette with a rotating tape coil carried by a flanged, reverse e-shaped hub in fixed radial angular relation to the base of the cassette. A tape receiving arc portion of the hub has a radius sufficiently great relative to the spring modulus of the tape to prevent binding. The arc portion is undercut to contain the tape.

9 Claims, 4 Drawing Figures

CONTINUOUS LOOP TAPE CASSETTE

The present invention relates to magnetic recording and playback. More particularly the invention relates to miniature, continuous loop magnetic tape cassettes.

PRIOR ART

British Pat. No. 1-250881 to Edward Alexander Leshik issued Oct. 20, 1971 discloses a continuous loop tape cassette. That patent is expressly incorporated herein by reference.

Cassettes made in accordance with the disclosure in the British Patent suffer from a number of disadvantages. The foremost problem arises from the use of the tape coil itself as a take-up spool; continuous smooth motion of the tape is essential to precise recording and playback. Such prior art cassettes, however, suffer from excessive binding of the tape. Further, such cassettes, when prerecorded, are not interchangeable with recorder-playback machines other than the original recording machines.

BRIEF DESCRIPTION OF THE INVENTION

In accordance with the invention there is provided a rectangular continuous loop tape cassette to store and dispense magnetic recording tape smoothly and continuously. A removable flanged, reverse 9-shaped hub has a central D-shaped opening to engage a D-shaped post attached to the base of the cassette. The bar of the D is fixed at a selected angle relative to the base. The hub carries a coil of tape the 9-shaped hub which is threaded around a post near an opening in a reference wall of the cassette. The tape passes over a resilient pad and is exposed to a magnetic recording/playback head. The tape then passes over a resilient pinch wheel engaged to a central post fixed to the base for urging the tape against an external drive capstan. The tape returns to the outside of the coil. The base is recessed to receive the flanged hub. The upper surface of the hub flange is above the level of the base. A portion of the base in the vicinity of the post is raised to maintain the tape free of the base along most of its path. In contrast, the tape of the prior art cassette contacts the base throughout its length. The 9-shaped hub has a radius, and a tape receiving arc portion for receiving the tape, which is sufficient relative to the spring modulus of the tape to avoid cinching.

The cover has snap-in engagement posts to engage hollow posts fixed to the base. After final assembly and test, the cover is ultrasonically welded along its periphery to the walls of the cassette.

To prevent over-writing previously recorded spliced tape, a light-reflective area indicates end of tape before the spliced area reaches the magnetic head. After the spliced area passes over the head another reflective area indicates beginning of tape. The reflective areas cooperate whith photo sensors in an external recorder/player to control the record circuits.

This is particularly useful for digital signal applications.

A removable reflective area provided by a pressure sensitive dot-shaped tab is attached to the cover to signify unrecorded tape. After tape is recorded, the tap is removed to disable the recording circuit.

A one-way channel is formed in the base to insure proper insertion of the cassette in one position only.

The cover has an embossed D-shaped extension to secure the hub in vertical position.

Separator posts are attached to the base to maintain the distance between the cover and base throughout the cassette.

OBJECTS

The objects of the invention are, therefore, to provide a continuous loop tape cassette which operates smoothly and continuously and, when prerecorded, is interchangeable with a plurality of recorder/players.

Other and further objects of the invention will be apparent from the following description of the invention, taken in connection with the accompanying drawings, and its scope will be defined in the appended claims.

DETAILED DESCRIPTION AND OPERATION OF THE CASSETTE IN FIGS. 1-4.

Figure 1:
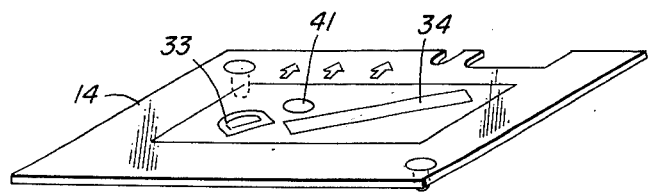
FIG. 1 is an exploded, perspective view of a preferred embodiment of the invention.
Figure 3:
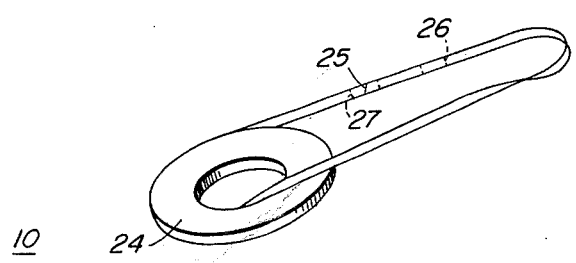
FIG. 3 is a sectional view of the base in FIG. 2 taken along the lines III—III.
Figure 3:
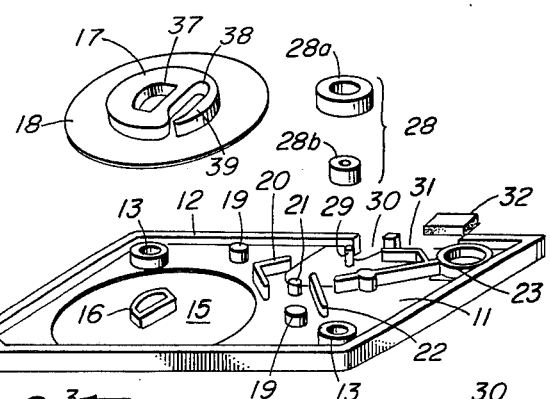
Figure 3:
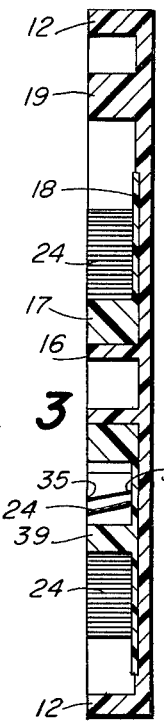

Referring now to the drawings and with particular reference to FIG. 1 there is here illustrated an exploded, perspective view of the preferred embodiment of the cassette of the invention.

The cassette is generally indicated at 10. A rectangular base 11 is affixed to a substantially continuous rectangular wall 12. The base 11 has a pair of hollow posts 13 for engagement with a cover 14. The base has a cylindrical recess 15 and D-shaped post 16 to receive a generally circular, 9-shaped, flanged, tape coil carrying hub 17 with flange 18. Separator posts 19 are affixed to the base and contact the cover 14. A V-shaped guide boss 20, a guide pin 21, a smoothly rounded horizontal guide boss 22 and cylindrical guide post 23 are affixed to the base 11. The flanged hub 17 carries a tape coil 24. A pair of reflective areas 25 and 26 in the vicinity of a splice 27 indicate end of tape and beginning of tape, respectively. A pinch-wheel 28 having a resilient tire 28a and axle hub 28b rotates about an axle post 29 affixed to the base 11. The forward wall 12 has openings 30 and 31 to access a record/playback head (not shown) and drive capstan (not shown), respectively. A resilient pad 32 is affixed to the base 11 to urge the tape 26 against a magnetic head.

A D-shaped extension 33 is formed in the bottom of the cover 14 to mate with the top surface of the hub 17 and secure it vertically. A recessed channel 34 is formed in the cover 14 to provide clearing for the tape 26. A pressure sensitive dot-shaped tab 41.

Figure 2:
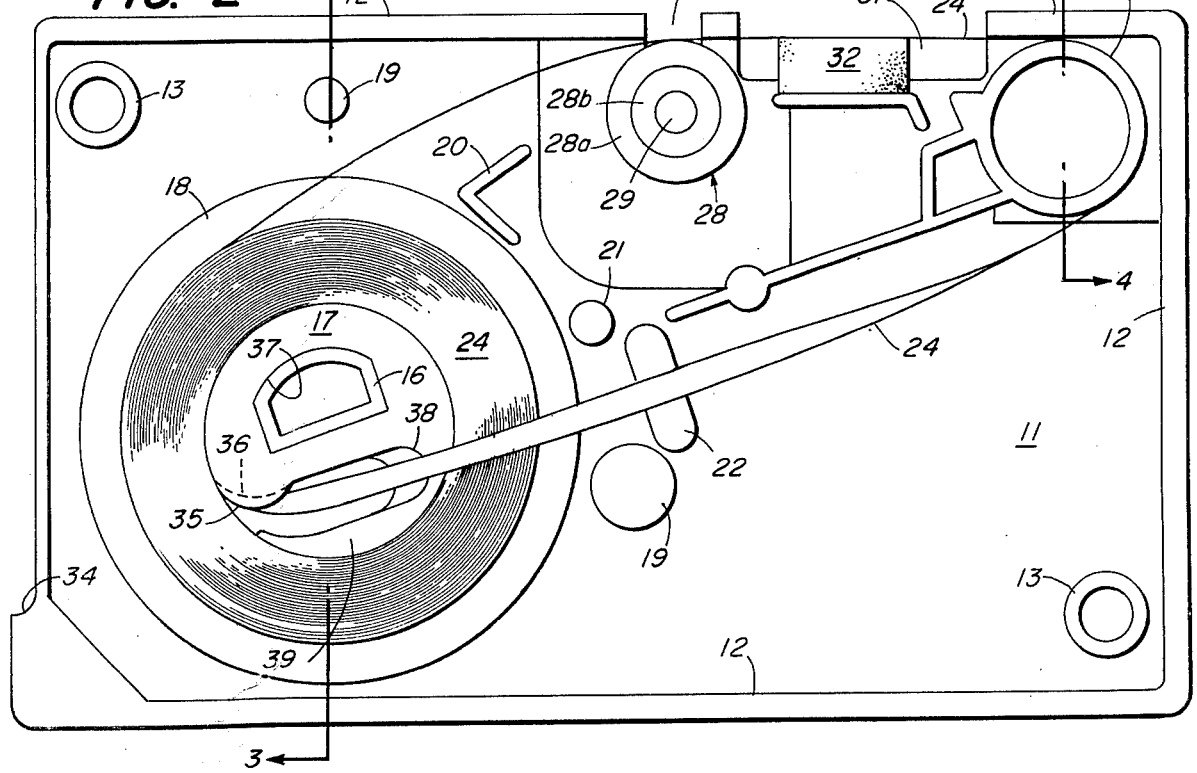
FIG. 2 is an enlarged plan view of the base assembly with the cover removed.

In FIG. 2, the details of the 9-shaped hub may be seen.

An inner convolution tape receiving arc portion 35 has an undercut 36 there around. The radius of the arc portion 35 in the preferred embodiment is 0.100 inch and the undercut is 10°. A D-shaped opening 37 engages the D-shaped post 16. The bar of the D is oriented in the preferred embodiment at 18° relative to the rear wall 12. The diameter of the flange may be 1.100 inch. The height of the hub above the flange may be .082 inch for use with tape 0.071 inch wide and 0.001 inch thick. The lower portion of the hub may be tapered down to 0.076 inch to locate moving tape. The angle of exit at the curved portion 38 leading to the arm 39 of the 9 may be 40° with a 0.010 inch radius break at the top. The thickness of the flange 18 may be 0.020 inch and extend 0.006 inch above the base.

In the preferred embodiment the cassette is 2.675 inch long, 1.575 inch wide and 0.200 inch thick. The material used has a low coefficient of friction such as polystyrene.

Figure 4:
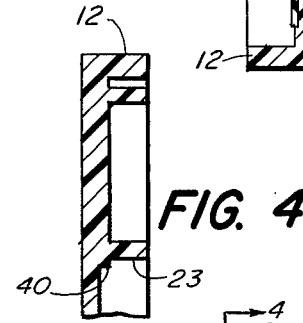
FIG. 4 is a sectional view of the base in FIG. 2 taken along the lines IV—IV.

A step, 40, or raised portion in the vicinity of the post 23 provides a lift in the preferred embodiment of 0.016 inch or 0.010 inch above the upper surface of the flange 18, as shown in FIG. 4.

OPERATION

The external capstan urges the tape against the pinch wheel 28 and drives it into the outer convolution of the coil 24. The coil rotates about the hub 17 and the tape exits about the arc portion 35. The tape is rotated 90° and exits out the curved portion 38 over the guide 22 to the post 23, over the pad 32 and pinch wheel 28.

It will be apparent that the tape may be paper, printed or other forms than magnetic.

While there has herein before been presented what at present is considered to be the preferred embodiment of the invention, it will be apparent that many and various changes and modifications may be made without departing from the true scope of the invention.

All such changes and modifications are, therefore, considered to be a part of this invention.

What is claimed is:

1. A continuous loop tape cassette, comprising:
a housing having
   A. a planar base means;
   B. a continuous wall affixed to the periphery of said base;
   C. a cover adapted to couple to said base;
   D. said wall having a flat, vertical reference surface with an opening therein to adapt said cassette to receive a tape drive and expose the tape along its axis for coupling said tape to an external device;
   E. said base means having a post means for engaging a flanged, generally circular, hub means;
   F. a stationary, generally circular, hub means having a flange for carrying a tape coil thereon, said hub means having a bore therethrough complementary to and fitted over said post means in fixed radial angular relation to said base means, said hub having means to avoid binding of said tape coil comprising a slot for guiding the inner convolution of the tape coil away from the coil toward the center of the coil, the leading end of the slot having an arc portion curving away from the coil and toward said bore, and the trailing end of the slot being inclined toward the arc portion from the top of the hub to the flange; said arc portion being undercut therearound to facilitate containment of said tape between said hub and said flange;
   G. a tape guide post near said wall opening, the base at the bottom of the post being raised to form a step above the upper surface of said flange; and
   H. a tape coil carried by said hub means, the tape being uncoiled from the inside of the coil through said slot and passing around said arc portion and thence over said inclined portion to said tape guide post, and thence over said step and around the tape guide post to the outer convolution of said coil.

2. The cassette of claim 1, wherein:
a resilient pinch wheel is rotatably engaged to said base means and located near said opening to engage said tape between said pinch wheel and an external drive capstan.

3. The cassette of claim 1, wherein:
said base means is recessed to receive said flanged hub means, the upper surface of said flange being above the base.

4. The cassette of claim 1, wherein:
said hub is 9 - shaped.

5. The cassette of claim 1, wherein:
said bore is D - shaped.

6. The cassette of claim 1, wherein:
the height of said hub is greater than the width of said tape.

7. The cassette of claim 1, wherein:
a portion of said cover is recessed to provide a free path for said tape.

8. The cassette of claim 1, wherein:
said cover and said base are adapted with snap-in posts for engagement therebetween.

9. The cassette of claim 1, wherein:
said cover has a shaped extension for securing said hub means in place when said cover is secured to said base.

* * * * *